United States Patent
Tian et al.

(10) Patent No.: US 12,505,304 B2
(45) Date of Patent: Dec. 23, 2025

(54) DIALOG DATA GENERATING

(71) Applicant: BEIJING BAIDU NETCOM SCIENCE TECHNOLOGY CO., LTD., Beijing (CN)

(72) Inventors: Xin Tian, Beijing (CN); Dongfeng He, Beijing (CN); Liankai Huang, Beijing (CN); Yingzhan Lin, Beijing (CN); Shiwei Huang, Beijing (CN)

(73) Assignee: BEIJING BAIDU NETCOM SCIENCE TECHNOLOGY CO., LTD., Beijing (CN)

(*) Notice: Subject to any disclaimer, the term of this patent is extended or adjusted under 35 U.S.C. 154(b) by 485 days.

(21) Appl. No.: 18/057,651

(22) Filed: Nov. 21, 2022

(65) Prior Publication Data
US 2023/0085458 A1 Mar. 16, 2023

(30) Foreign Application Priority Data
Nov. 26, 2021 (CN) .......................... 202111419074.5

(51) Int. Cl.
*G10L 15/06* (2013.01)
*G06F 16/334* (2025.01)
(Continued)

(52) U.S. Cl.
CPC .............. *G06F 40/35* (2020.01); *G06F 16/35* (2019.01); *G06F 40/186* (2020.01);
(Continued)

(58) Field of Classification Search
None
See application file for complete search history.

(56) References Cited

U.S. PATENT DOCUMENTS 9,606,984 B2 * 3/2017 Lavallée ............... G10L 15/063
10,885,906 B2 * 1/2021 Steedman Henderson ..................
.................................................. G10L 15/1822
(Continued)

FOREIGN PATENT DOCUMENTS

CN 111428011 A 7/2020
CN 111737417 A * 10/2020 ......... G06F 16/3344
(Continued)

OTHER PUBLICATIONS

Extended European Search Report issued in counterpart EP application No. 22209084.7, mailed Mar. 31, 2023, 7 pages.
(Continued)

*Primary Examiner* — Richa Sonifrank
(74) *Attorney, Agent, or Firm* — FisherBroyles, LLP

(57) ABSTRACT

A method for generating dialog data is provided. An implementation is: obtaining a target dialog data template, where the target dialog data template includes one or more target single-round dialog data templates, each target single-round dialog data template includes one or more keyword slots and related information about each keyword slot, and the related information about each keyword slot includes location information and attribute information; for each keyword slot, determining, from a keyword data set at least based on the attribute information of the keyword slot, one or more target keywords that match the keyword slot; and for each target single-round dialog data template, filling the target single-round dialog data template with the one or more target keywords based on the location information of the one or more keyword slots, to obtain target dialog data.

15 Claims, 4 Drawing Sheets

Obtain a target dialog data template, where the target dialog data template includes one or more target single-round dialog data templates, each target single-round dialog data template includes one or more keyword slots and related information about each keyword slot, and the related information about each keyword slot includes location information and attribute information — S101

For each keyword slot, determine, from a keyword data set at least based on the attribute information of the keyword slot, a target keyword that match the keyword slot, where the keyword data set includes a plurality of keywords and attribute information of each keyword — S102

For each target single-round dialog data template of the target dialog data template, fill the target single-round dialog data template with the one or more target keywords based on the location information of the one or more keyword slots, to obtain target dialog data — S103

(51) Int. Cl.
  *G06F 16/35* (2025.01)
  *G06F 40/186* (2020.01)
  *G06F 40/279* (2020.01)
  *G06F 40/284* (2020.01)
  *G06F 40/35* (2020.01)
  *G06N 3/08* (2023.01)
  *G06N 20/00* (2019.01)
  *G10L 15/16* (2006.01)
  *G10L 15/18* (2013.01)
  *G10L 15/22* (2006.01)

(52) U.S. Cl.
  CPC ............ *G06F 40/279* (2020.01); *G06N 3/08* (2013.01); *G10L 15/063* (2013.01); *G10L 15/16* (2013.01); *G10L 15/1815* (2013.01); *G10L 15/22* (2013.01); *G06F 16/3344* (2019.01); *G06F 40/284* (2020.01); *G06N 20/00* (2019.01); *G10L 2015/0633* (2013.01)

(56) References Cited

U.S. PATENT DOCUMENTS

| | | | | |
|---|---|---|---|---|
| 11,132,988 | B1* | 9/2021 | Steedman Henderson | G10L 15/22 |
| 11,880,665 | B2* | 1/2024 | Aher | G06F 16/3329 |
| 2018/0293507 | A1* | 10/2018 | Lian | G06F 16/337 |
| 2018/0357566 | A1* | 12/2018 | Liu | G06N 7/01 |
| 2019/0340201 | A1* | 11/2019 | Havens | G06N 20/00 |
| 2021/0027770 | A1* | 1/2021 | Olabiyi | G06F 40/35 |
| 2021/0056169 | A1* | 2/2021 | Bahirwani | H04L 51/02 |
| 2021/0232121 | A1* | 7/2021 | Pramanick | G06F 40/30 |
| 2021/0248471 | A1 | 8/2021 | Jiao et al. | |
| 2022/0165274 | A1* | 5/2022 | Chiba | G06F 40/268 |
| 2022/0300718 | A1* | 9/2022 | Chen | G06F 40/295 |
| 2022/0335303 | A1* | 10/2022 | Haidar | G06N 3/094 |
| 2022/0414344 | A1* | 12/2022 | Makki Niri | G06F 40/30 |
| 2023/0084583 | A1* | 3/2023 | Zeng | G10L 15/063 |
| | | | | 704/243 |
| 2023/0244878 | A1* | 8/2023 | Zhao | G06F 40/279 |
| | | | | 704/9 |
| 2024/0046043 | A1* | 2/2024 | Olabiyi | G06N 20/00 |

FOREIGN PATENT DOCUMENTS

| | | | |
|---|---|---|---|
| CN | 111930916 A | | 11/2020 |
| CN | 112256851 A | | 1/2021 |
| CN | 112307774 A | | 2/2021 |
| CN | 112417894 A | | 2/2021 |
| CN | 112784030 A | | 5/2021 |
| CN | 112906381 A | * 6/2021 | .......... G06F 40/295 |
| CN | 112988956 A | | 6/2021 |
| CN | 113641807 A | | 11/2021 |
| JP | 2007052043 A | | 3/2007 |
| JP | 2021135839 A | | 9/2021 |
| WO | 2021232957 A1 | | 11/2021 |
| WO | 2022095845 A1 | | 5/2022 |

OTHER PUBLICATIONS

First Office Action issued in the related foreign application, CN Appl. No. 202111419074.5, issued Aug. 24, 2022, 8 pages.

Notice of Allowance from the related foreign application, CN Appl. No. 202111419074.5, issued Nov. 15, 2022, 4 pages.

First Office Action of the counterpart JP application No. 2022-179265 (Official mailing date: Jan. 25, 2024), 10 pages.

* cited by examiner

DIALOG DATA GENERATING

CROSS REFERENCE TO RELATED APPLICATION

This application claims priority to Chinese Patent Application No. 202111419074.5, filed on Nov. 26, 2021, the contents of which are hereby incorporated by reference in their entirety for all purposes.

TECHNICAL FIELD

The present disclosure relates to the technical field of artificial intelligence, in particular to the technical field of natural language processing and deep learning, and specifically to a method for generating dialog data, an electronic device, a computer-readable storage medium.

BACKGROUND

Artificial intelligence is a subject on making a computer simulate some thinking processes and intelligent behaviors (such as learning, reasoning, thinking, and planning) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, machine learning/deep learning, big data processing technologies, and knowledge graph technologies.

A task-oriented dialog (TOD) system is oriented to a vertical field, aiming at helping a user complete an intended task or action, such as booking an air ticket, playing music, and route navigation, with as few dialog rounds as possible. A small scale of data in most task-oriented dialog application scenarios does not allow access to a large amount of dialog data. Consequently, a model can hardly be trained by using a large amount of data, limiting the use of task-oriented dialogs in various fields.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a method for generating dialog data, an electronic device, a computer-readable storage medium.

According to an aspect of the present disclosure, there is provided a method for generating dialog data, the method including: obtaining a target dialog data template, where the target dialog data template includes one or more target single-round dialog data templates, each target single-round dialog data template includes one or more keyword slots and related information about each keyword slot, and the related information about each keyword slot includes location information and attribute information; for each keyword slot, determining, from a keyword data set based on at least the attribute information of the keyword slot, a target keyword that match the keyword slot, where the keyword data set includes a plurality of keywords and attribute information of each keyword; and for each target single-round dialog data template of the target dialog data template, filling the target single-round dialog data template with one or more target keywords based on the location information of the one or more keyword slots, to obtain target dialog data.

According to one aspect of the present disclosure, an electronic device is provided, including: one or more processors; a memory storing one or more programs configured to be executed by the one or more processors, the one or more programs including instructions for: obtaining a target dialog data template, wherein the target dialog data template comprises one or more target single-round dialog data templates, each target single-round dialog data template comprises one or more keyword slots and related information about each keyword slot, and the related information about each keyword slot comprises location information and attribute information; for each keyword slot, determining, from a keyword data set based on at least the attribute information of the keyword slot, a target keyword that match the keyword slot, wherein the keyword data set comprises a plurality of keywords and attribute information of each keyword; and for each target single-round dialog data template of the target dialog data template, filling the target single-round dialog data template with one or more target keywords based on the location information of the one or more keyword slots, to obtain target dialog data.

According to one aspect of the present disclosure, a non-transitory computer-readable storage medium storing one or more programs is provided, the one or more programs comprising instructions, which when executed by one or more processors of an electronic device, cause the electronic device to: obtaining a target dialog data template, wherein the target dialog data template comprises one or more target single-round dialog data templates, each target single-round dialog data template comprises one or more keyword slots and related information about each keyword slot, and the related information about each keyword slot comprises location information and attribute information; for each keyword slot, determining, from a keyword data set based on at least the attribute information of the keyword slot, a target keyword that match the keyword slot, wherein the keyword data set comprises a plurality of keywords and attribute information of each keyword, and for each target single-round dialog data template of the target dialog data template, filling the target single-round dialog data template with one or more target keywords based on the location information of the one or more keyword slots, to obtain target dialog data.

According to one or more embodiments of the present disclosure, a large amount of dialog data may be efficiently generated, meeting requirements of actual applications.

It should be understood that the content described in this section is not intended to identify critical or important features of the embodiments of the present disclosure, and is not used to limit the scope of the present disclosure. Other features of the present disclosure will be easily understood through the following description.

BRIEF DESCRIPTION OF THE DRAWINGS

The accompanying drawings exemplarily show embodiments and form a part of the specification, and are used to explain example implementations of the embodiments together with a written description of the specification. The embodiments shown are merely for illustrative purposes

DETAILED DESCRIPTION OF EMBODIMENTS

Example embodiments of the present disclosure are described below with reference to the accompanying drawings, where various details of the embodiments of the present disclosure are included for a better understanding, and should be considered as merely example. Therefore, those of ordinary skill in the art should be aware that various changes and modifications can be made to the embodiments described herein, without departing from the scope of the present disclosure. Likewise, for clarity and conciseness, the description of well-known functions and structures is omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, there may be one or more elements, unless otherwise expressly indicated in the context. Moreover, the term "and/or" used in the present disclosure encompasses any of and all possible combinations of listed items.

A small scale of data in most task-oriented dialog application scenarios does not allow access to a large amount of dialog data. Consequently, a model can hardly be trained by using a large amount of data, limiting the use of task-oriented dialogs in various fields. In the related art, dialog data is obtained by means of manual construction and annotation, which has a low efficiency, high costs, and a limited diversity of dialog data available.

In order to solve the above problems, the present disclosure provides a method for generating dialog data. By obtaining or constructing a dialog data template including keyword slots and related information about the keyword slots, and filling the dialog data template based on the related information about the keyword slots, dialog data is obtained. The method can efficiently generate a large amount of dialog data, meeting requirements of actual applications.

The embodiments of the present disclosure will be described below in detail with reference to the accompanying drawings.

Figure 1:
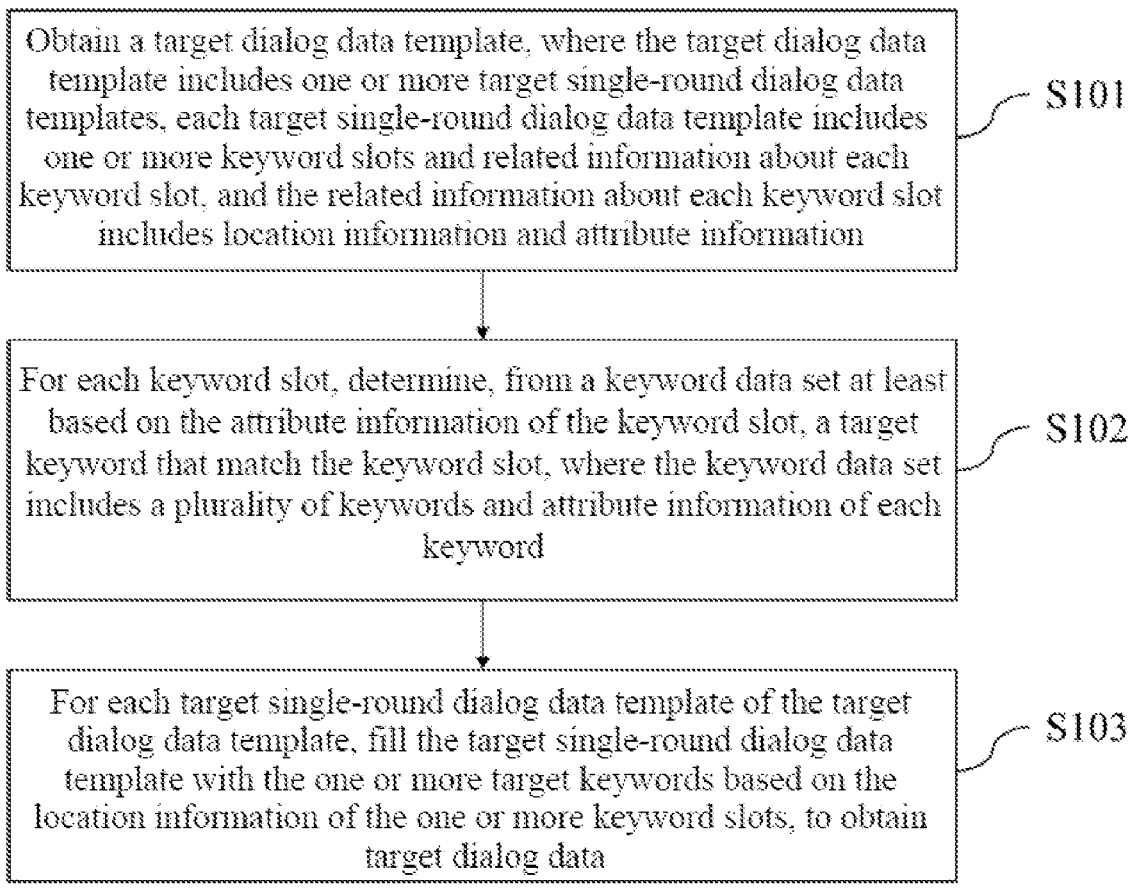
FIG. 1 is a flowchart of a method for generating dialog data according to an example embodiment of the present disclosure.

FIG. 1 is a flowchart of a method for generating dialog data according to an example embodiment of the present disclosure. As shown in FIG. 1, the method includes: step S101: obtaining a target dialog data template, where the target dialog data template includes one or more target single-round dialog data templates, each target single-round dialog data template includes one or more keyword slots and related information about each keyword slot, and the related information about each keyword slot includes location information and attribute information; step S102: for each keyword slot, determining, from a keyword data set based on at least the attribute information of the keyword slot, a target keyword that match the keyword slot, where the keyword data set includes a plurality of keywords and attribute information of each keyword; and step S103: for each target single-round dialog data template of the target dialog data template, filling the target single-round dialog data template with the one or more target keywords based on the location information of the one or more keyword slots, to obtain target dialog data. Thus, based on the related information about the keyword slots in the dialog data template, corresponding keywords can be automatically matched for filling, thereby obtaining the target dialog data. In the method, information in the dialog data template can be fully used to automatically generate the dialog data, thereby efficiently obtaining a large amount of dialog data at low costs and meeting requirements of actual applications.

According to some embodiments, the attribute information of each keyword slot includes at least one of part-of-speech information and class information of a keyword filled in the keyword slot. Thus, by matching the part-of-speech information and/or the class information with the keyword filled in the keyword slot, the diversity of the dialog data can be increased.

According to some embodiments, step S101 of obtaining a target dialog data template includes: obtaining historical dialog data, where the historical dialog data includes one or more pieces of historical single-round dialog data, and each piece of historical single-round dialog data includes at least one keyword; and determining, based on the at least one keyword included in each piece of historical single-round dialog data, one or more keyword slots and related information about each keyword slot to obtain a target single-round dialog data template corresponding to the historical single-round dialog data. Thus, the existing historical dialog data can be fully used, and the dialog data template is built based on information about the keywords included in the historical dialog data, thereby generating dialog data closer to a real scenario and lowering costs of dialog data generation.

According to some embodiments, each piece of historical single-round dialog data further includes intent information, and step S101 of obtaining a target dialog data template further includes: determining the intent information of each piece of historical single-round dialog data as intent information of the corresponding target single-round dialog data template. The intent information is used to indicate an intent of a single-round dialog, and thus, the dialog data with the intent information can be generated, fully meeting requirements of actual applications.

Figure 2:
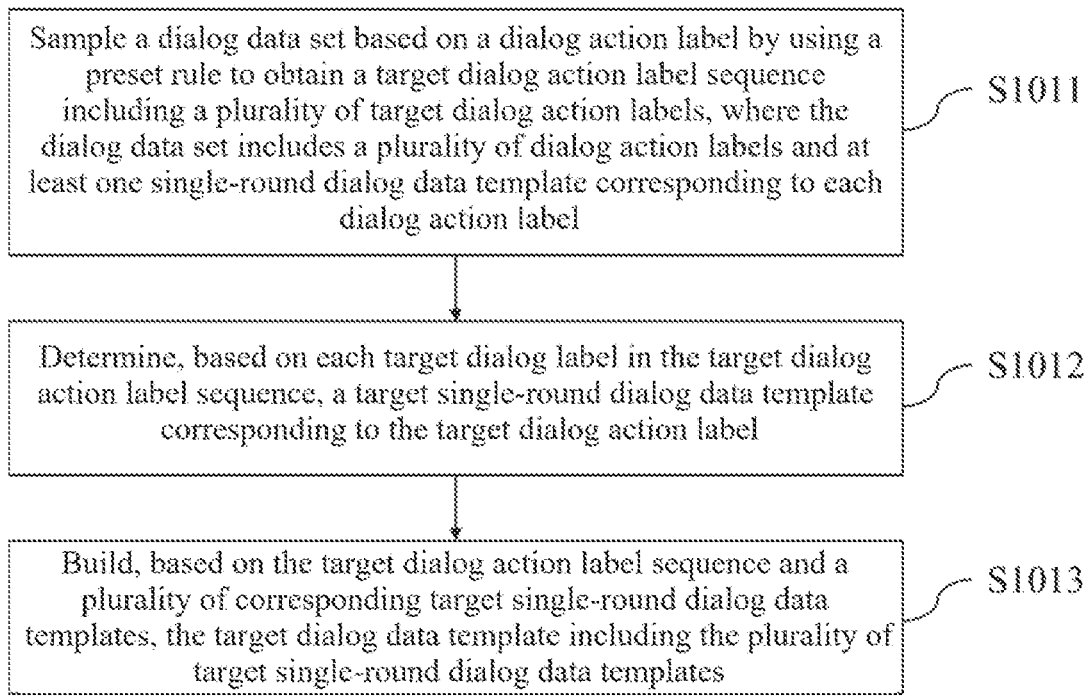
FIG. 2 is a flowchart of obtaining a target dialog data template according to an example embodiment of the present disclosure.

FIG. 2 is a flowchart of obtaining a target dialog data template according to an example embodiment of the present disclosure. As shown in FIG. 2, according to some embodiments, the target dialog data template includes a plurality of single-round dialog data templates, and step S101 of obtaining a target dialog data template includes: step S1011: sampling a dialog data set based on a dialog action label by using a preset rule to obtain a target dialog action label sequence including a plurality of target dialog action labels, where the dialog data set includes a plurality of dialog action labels and a plurality of single-round dialog data templates corresponding to the plurality of dialog action labels; step S1012: determining, based on each target dialog action label in the target dialog action label sequence, a target single-round dialog data template corresponding to the target dialog action label; and step S1013: building, based on the target dialog action label sequence and a plurality of target single-round dialog data templates corresponding to the target dialog action label sequence, the target dialog data template including the plurality of target single-round dialog data templates. The dialog action label is used to indicate a purpose of single-round dialog data. By randomly sampling a dialog action label and then obtaining a target single-round dialog data template based on the dialog action label, a target dialog data template with more diversity can be generated. Thus, without being limited to a form of historical dialog data, a target dialog data template in a plurality of forms can be obtained by manually constructing a certain number of single-round dialog data templates, thereby generating dialog data with more diversity. It may be understood that the diversity of the generated dialog data can be further increased by increasing the number of manually constructed single-round dialog data templates, and thus the method has a greater flexibility.

Exemplarily, the dialog action label may include "user request", "system reply", etc., being used to indicate the purpose of the single-round dialog data. In an example, the target dialog data is applied to the field of hotel information inquiry and booking. A dialog action label "user request" may correspond to a single-round dialog data template "I need a hotel with [location information] and [hotel rating information]", where the dialog action label may indicate a user's request for hotel information inquiry. Correspondingly, a dialog action label "system reply" may correspond to a single-round dialog data template "I've found a hotel with [price information] and [name of hotel] for you", where the dialog action label may indicate a reply of a system to the user's request.

According to some embodiments, step S1011 of sampling a dialog data set based on a dialog action label by using a preset rule includes: for each target dialog action label in the target dialog action label sequence, determining respective sampling probabilities of the plurality of dialog action labels based on at least a preceding target dialog action label of the target dialog action label; and sampling the dialog data set based on the respective sampling probabilities of the plurality of dialog action labels, to obtain the target dialog action label. Thus, dialog data closer to a real scenario can be obtained, fully meeting requirements of actual applications.

According to some embodiments, each target single-round dialog data template in the target dialog data template further includes intent information, and the intent information of each target single-round dialog data template is determined based on the dialog action label corresponding to the target single-round dialog data template. The intent information is used to indicate an intent of a single-round dialog, and thus, the dialog data with the intent information can be generated, fully meeting requirements of actual applications.

According to some embodiments, the related information about each keyword slot further includes expression information of the keyword slot, and the method for generating dialog data further includes: obtaining an expression information set of the keyword slot, the expression information set including a plurality of mapping relationships between the expression information and the attribute information of the keyword slot, and step S103 of filling the target single-round dialog data template with the one or more target keywords, to obtain target dialog data includes: determining the expression information of the keyword slot from the expression information set of the keyword slot based on the attribute information of each keyword slot included in the target single-round dialog data template; and filling the target single-round dialog data template with the one or more target keywords based on the location information and the expression information of the one or more keyword slots, to obtain the target dialog data. The expression information is used to indicate an expression of a word or a sentence filled in the keyword slot, and thus, the diversity of the dialog data can be increased.

In an example, the target dialog data is applied to the field of hotel information inquiry and booking. For example, the target single-round dialog data template may be "I need a hotel with [location information] and [hotel rating information]", and the single-round dialog data template includes two keyword slots: [location information] and [hotel rating information]. Expression information corresponding to the keyword slot [location information] may be "located at [hotel location]", where a target keyword corresponding to [hotel location] may be "city center". Expression information corresponding to the keyword slot [hotel rating information] may be "[hotel rating]-star", where a target keyword corresponding to [hotel rating] may be "four". Based on the location information and the expression information of the keyword slots, the target single-round dialog data template is filled with the target keywords to obtain target single-round dialog data "I need a four-star hotel located at the city center". For another example, the single-round dialog data template may alternatively be "I've found a hotel with [price information] and [name of hotel] for you", and the single-round dialog data template includes two keyword slots: [price information] and [name of hotel]. Expression information corresponding to the keyword slot [price information] may be "priced [price adjective]", where a target keyword corresponding to [price adjective] may be "cheap". Expression information corresponding to the keyword slot [name of hotel] may be "called [name of hotel]", where a target keyword corresponding to [name of hotel] may be "Shiwaitaoyuan". Based on the location information and the expression information of the keyword slots, the target single-round dialog data template is filled with the target keywords to obtain target single-round dialog data "I've found a cheap hotel called Shiwaitaoyuan for you".

The example embodiments of the present disclosure will be further described below with reference to the accompanying drawings.

Figure 3:
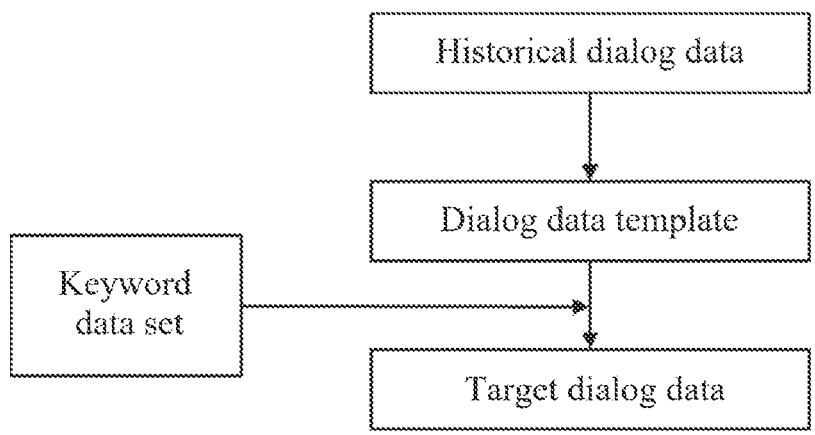
FIG. 3 is a schematic diagram of a process for generating dialog data according to an example embodiment of the present disclosure.

FIG. 3 is a schematic diagram of a process for generating dialog data according to an example embodiment of the present disclosure. As shown in FIG. 3, historical dialog data may be, for example, "help me find singer A's song B", and keywords included therein are "singer A" and "song B". Based on information about the two keywords, two keyword slots and related information about the two keyword slots in the historical dialog data can be determined, thereby obtaining a target dialog data template "help me find [character]'s [work]", where the two keyword slots [character] and [work] are included. Based on the information about the two keyword slots, a keyword "actor C" matching [character] and a keyword "film D" matching [work] can be determined from a keyword data set. Based on location information of the keyword slots, the target dialog data template is filled with the determined keywords, and then target dialog data "help me find actor C's film D" can be obtained.

In the above example, the target dialog data template is obtained by obtaining the historical dialog data and the keywords included therein. According to the method for generating dialog data of the present disclosure, the target dialog data template may alternatively be obtained by sampling the dialog data set.

In another example, the target dialog data is applied to the field of intelligent travel information inquiry and booking; a dialog action label included in a corresponding dialog data set includes "user request", "more detail requirements of a user", "user booking request", "system reply", "system booking confirmation", "general-purpose goodbye sentence", and the like, and each dialog action label may correspond to one or more single-round dialog data templates. According to the method for generating dialog data of the present disclosure, first, based on a dialog action label, a target dialog action label sequence is obtained by sampling a dialog data set by using a preset rule, and the obtained target dialog action label sequence is, for example, "user request-system reply". Based on each target dialog action label in the target dialog action label sequence, a target single-round dialog data template corresponding to the target dialog action label may be determined. For example, a corresponding target single-round dialog data template "please find a hotel located at [location information]" is determined based on the "user request"; a corresponding target single-round dialog data template "I've found [name of hotel] located at [location information] for you" is determined based on the "system reply". The target single-round dialog data templates include the keyword slot [location information], and then based on attribute information of the keyword slot, expression information of the keyword slot may be determined from an expression information set of the keyword slot. For example, the expression information of the keyword slot is "located near [site]". Further, based on the attribute information of the keyword slot, a matching target keyword may be determined from the keyword data set. For example, the target keyword is "site A". Based on attribute information of the other keyword slot [name of hotel], for example, an expected matching target keyword "hotel B" may be determined from the keyword data set. Based on the location information and the expression information of the keyword slots, corresponding target single-round dialog data templates are filled with the target keywords. Then target single-round dialog data "please find a hotel near site A" and "I've found hotel B near site A for you" may be obtained, that is, the two pieces of target single-round dialog data constitute the target dialog data.

It may be understood that each dialog action label may correspond to a plurality of single-round dialog data templates. In the above examples, another single-round dialog data template may also be determined based on the target dialog action label sequence, so that target dialog data different from the above examples is generated, thereby increasing the diversity of the dialog data. The attribute information of each keyword slot may correspond to a plurality of pieces of expression information. In the above examples, other expression information may also be determined based on the attribute information of the keyword slot, so that target dialog data different from the above examples is generated, thereby increasing the diversity of the dialog data.

Figure 4:
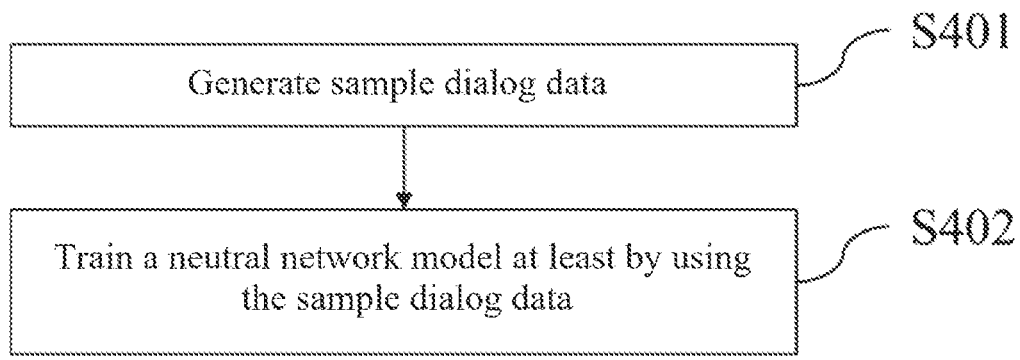
FIG. 4 is a flowchart of a method for training a neural network model according to an example embodiment of the present disclosure.

According to another aspect of the present disclosure, there is further provided a method for training a neural network model. FIG. 4 is a flowchart of a method for training a neural network model according to an example embodiment of the present disclosure. As shown in FIG. 4, the method includes: step S401: generating sample dialog data; and step S402: training the neural network model at least by using the sample dialog data, where exemplarily, in step S401, the sample dialog data may be generated by using the above method for generating dialog data. Thus, the neural network model can be trained by using a large amount of generated dialog data, thereby improving the performance of the model.

According to some embodiments, the neural network model is a pre-trained model, and step S402 of training the neural network model at least by using the sample dialog data includes: fine-tuning the neural network model by using the sample dialog data. Thus, when there is a lack of field data, the method described in the present disclosure can be used to generate dialog data of a new field, fine tune the pre-trained model, and improve the performance of the model in a corresponding field.

Figure 5:
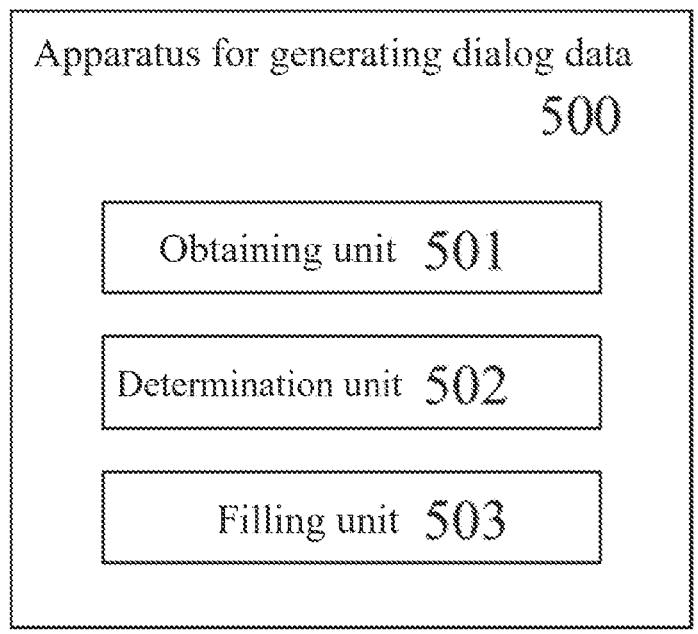
FIG. 5 is a structural block diagram of an apparatus for generating dialog data according to an example embodiment of the present disclosure.

According to another aspect of the present disclosure, there is further provided an apparatus for generating dialog data. FIG. 5 is a structural block diagram of an apparatus for generating dialog data according to an example embodiment of the present disclosure. As shown in FIG. 5, the apparatus 500 for generating dialog data includes: an obtaining unit 501 configured to obtain a target dialog data template, where the target dialog data template includes one or more target single-round dialog data templates, each target single-round dialog data template includes one or more keyword slots and related information about each keyword slot, and the related information about each keyword slot includes location information and attribute information; a determination unit 502 configured to: for each keyword slot, determine, from a keyword data set based on at least the attribute information of the keyword slot, a target keyword that match the keyword slot, where the keyword data set includes a plurality of keywords and attribute information of each keyword; and a filling unit 503 configured to: for each target single-round dialog data template of the target dialog data template, fill the target single-round dialog data template with the one or more target keywords based on the location information of the one or more keyword slots, to obtain target dialog data. The operations of the unit 501 to the unit 503 of the apparatus 500 for generating dialog data are similar to the operations of step S101 to step S103 described above, and details are not described herein again.

Figure 6:
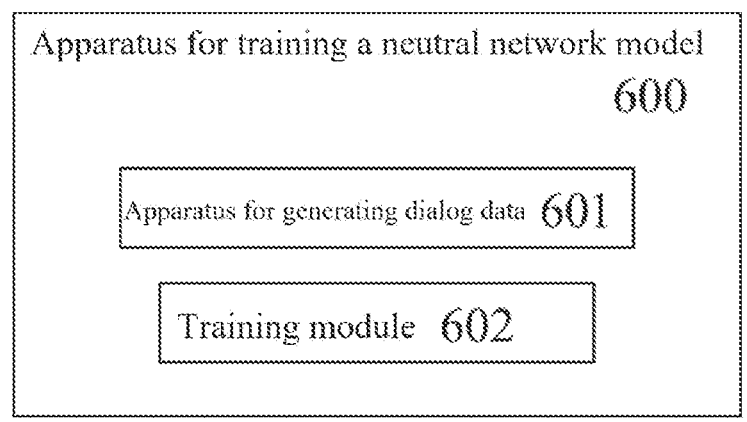
FIG. 6 is a structural block diagram of an apparatus for training a neural network model according to an example embodiment of the present disclosure.

According to another aspect of the present disclosure, there is further provided an apparatus for training a neural network model. FIG. 6 is a structural block diagram of an apparatus for training a neural network model according to an example embodiment of the present disclosure. As shown in FIG. 6, the apparatus 600 for training the neural network model includes: an apparatus for generating dialog data 601, where the apparatus is configured to generate sample dialog data; and a training module 602 configured to train the neural network model at least by using the sample dialog data. The operations of the apparatus for generating dialog data 601 and the training module 602 of the apparatus 600 for training the neural network model are similar to the operations of step S401 and step S402 described above, and details are not described herein again.

According to another aspect of the present disclosure, there is further provided an electronic device, including: at least one processor; and a memory communicatively connected to the at least one processor, where the memory stores instructions executable by the at least one processor, and when executed by the at least one processor, the instructions cause the at least one processor to perform the method for generating dialog data or the method for training the neural network model described above.

According to another aspect of the present disclosure, there is further provided a non-transitory computer-readable storage medium storing computer instructions, where the computer instructions are used to cause the computer to perform the method for generating dialog data or the method for training the neural network model described above.

According to another aspect of the present disclosure, there is provided a computer program product, including a computer program, where when the computer program is executed by a processor, the method for generating dialog data or the method for training the neural network model described above is implemented.

Figure 7:
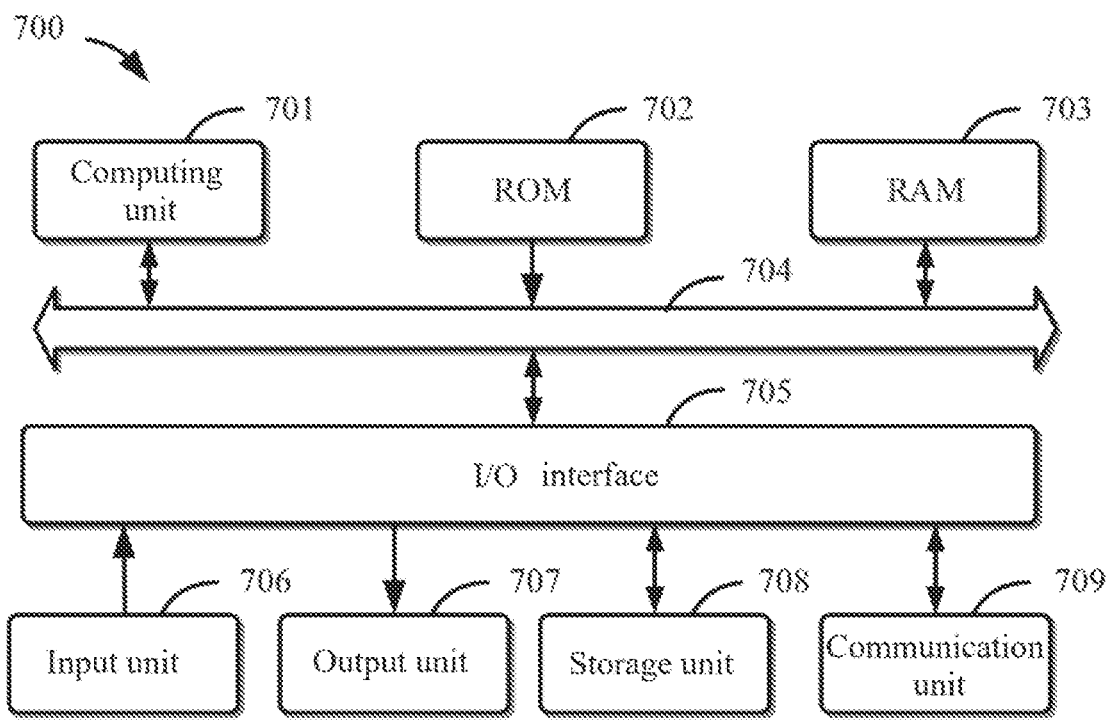
FIG. 7 is a structural block diagram of an example electronic device that can be used to implement an embodiment of the present disclosure.

Referring to FIG. 7, a structural block diagram of an electronic device 700 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 7, the device 700 includes a computing unit 701, which may perform various appropriate actions and processing according to a computer program stored in a read-only memory (ROM) 702 or a computer program loaded from a storage unit 708 to a random access memory (RAM) 703. The RAM 703 may further store various programs and data required for the operation of the device 700. The computing unit 701, the ROM 702, and the RAM 703 are connected to each other through a bus 704. An input/output (I/O) interface 705 is also connected to the bus 704.

A plurality of components in the device 700 are connected to the I/O interface 705, including: an input unit 706, an output unit 707, the storage unit 708, and a communication unit 709. The input unit 706 may be any type of device capable of entering information to the device 700. The input unit 706 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 707 may be any type of device capable of presenting information, and may include, but is not limited to, a display, a speaker, a video/audio output terminal, a vibrator, and/or a printer. The storage unit 708 may include, but is not limited to, a magnetic disk and an optical disc. The communication unit 709 allows the device 700 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, an 802.11 device, a Wi-Fi device, a WiMAX device, a cellular communication device, and/or the like.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 701 performs the various methods and processing described above, for example, the method for generating dialog data or the method for training the neural network model. For example, in some embodiments, the method for generating dialog data or the method for training the neural network model may be implemented as a computer software program, which is tangibly contained in a machine-readable medium, such as the storage unit 708. In some embodiments, a part or all of the computer program may be loaded and/or installed onto the device 700 via the ROM 702 and/or the communication unit 709. When the computer program is loaded onto the RAM 703 and executed by the computing unit 701, one or more steps of the method for generating dialog data or the method for training the neural network model described above can be performed. Alternatively, in other embodiments, the computing unit 701 may be configured, by any other suitable means (for example, by means of firmware), to perform the method for generating dialog data or the method for training the neural network model.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: The systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and a pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, a voice input, or a tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, a server in a distributed system, or a server combined with a blockchain.

It should be understood that steps may be reordered, added, or deleted based on the various forms of procedures shown above. For example, the steps recorded in the present disclosure may be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be appreciated that the method, system, and device described above are merely example embodiments or examples, and the scope of the present invention is not limited by the embodiments or examples, but defined only by the granted claims and the equivalent scope thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

What is claimed is:

1. A computer-implemented method for training a neural network model with generated dialog data, comprising:
    obtaining a target dialog data template, wherein the target dialog data template comprises one or more target single-round dialog data templates, wherein each target single-round dialog data template comprises one or more keyword slots and related information about each keyword slot, and wherein the related information about each keyword slot comprises location information and attribute information;
    for each keyword slot, determining, from a keyword data set based on at least the attribute information of the keyword slot, a target keyword that matches the keyword slot, wherein the keyword data set comprises a plurality of keywords and attribute information of each keyword;
    for each target single-round dialog data template of the target dialog data template, filling the target single-round dialog data template with one or more target keywords based on the location information of the one or more keyword slots, to obtain target dialog data, and
    training a neural network model by using the target dialog data;
    wherein the target dialog data template comprises a plurality of single-round dialog data templates, and wherein the obtaining the target dialog data template comprises:
    sampling a dialog data set stored in a memory of the computer based on a dialog action label by using a preset rule to obtain a target dialog action label sequence comprising a plurality of target dialog action labels, wherein the dialog data set comprises a plurality of dialog action labels and a plurality of single-round dialog data templates corresponding to the plurality of the dialog action labels;
    determining, based on each target dialog action label in the target dialog action label sequence, a target single-round dialog data template corresponding to the target dialog action label; and
    building, based on the target dialog action label sequence and a plurality of target single-round dialog data templates corresponding to the target dialog action label sequence, the target dialog data template comprising the plurality of target single-round dialog data templates,
    and wherein, the sampling the dialog data set based on the dialog action label by using the preset rule comprises:

for each target dialog action label in the target dialog action label sequence, determining respective sampling probabilities of the plurality of dialog action labels based at least on a preceding target dialog action label of the target dialog action label; and sampling the dialog data set based on the respective sampling probabilities of the plurality of dialog action labels, to obtain the target dialog action label.

2. The method according to claim 1, wherein the obtaining the target dialog data template comprises:

obtaining historical dialog data, wherein the historical dialog data comprises one or more pieces of historical single-round dialog data, and each piece of the historical single-round dialog data comprises at least one keyword; and determining, based on the at least one keyword comprised in each piece of historical single-round dialog data, the one or more keyword slots and the related information about each keyword slot to obtain the target single-round dialog data template corresponding to the historical single-round dialog data.

3. The method according to claim 2, wherein each piece of the historical single-round dialog data further comprises intent information, and wherein the obtaining the target dialog data template further comprises:

determining the intent information of each piece of the historical single-round dialog data as the intent information of the target single-round dialog data template corresponding to the historical single-round dialog data.

4. The method according to claim 1, wherein each target single-round dialog data template in the target dialog data template further comprises intent information, wherein the intent information of each target single-round dialog data template is determined based on the dialog action label corresponding to the target single-round dialog data template.

5. The method according to claim 1, wherein the related information about each keyword slot further comprises expression information of the keyword slot, and wherein the method further comprises:

obtaining an expression information set of the keyword slot, wherein the expression information set comprises a plurality of mapping relationships between the expression information and the attribute information of keyword slots, wherein the filling the target single-round dialog data template with the one or more target keywords, to obtain the target dialog data comprises:

determining the expression information of the keyword slot from the expression information set of the keyword slot based on the attribute information of each keyword slot comprised in the target single-round dialog data template; and filling the target single-round dialog data template with the one or more target keywords based on the location information and the expression information of the one or more keyword slots, to obtain the target dialog data.

6. The method according to claim 1, wherein the attribute information of each keyword slot comprises at least one of part-of-speech information and class information of a keyword filled in the keyword slot.

7. The method according to claim 1, wherein the neural network model is a pre-trained model, and wherein the training the neural network model by using the target dialog data comprises:

fine-tuning the neural network model by using the target dialog data.

8. An electronic device, comprising:

one or more processors;

a memory storing one or more programs configured to be executed by the one or more processors, the one or more programs including instructions for:

obtaining a target dialog data template, wherein the target dialog data template comprises one or more target single-round dialog data templates, wherein each target single-round dialog data template comprises one or more keyword slots and related information about each keyword slot, and wherein the related information about each keyword slot comprises location information and attribute information;

for each keyword slot, determining, from a keyword data set based on at least the attribute information of the keyword slot, a target keyword that matches the keyword slot, wherein the keyword data set comprises a plurality of keywords and attribute information of each keyword;

for each target single-round dialog data template of the target dialog data template, filling the target single-round dialog data template with one or more target keywords based on the location information of the one or more keyword slots, to obtain target dialog data, and training a neural network model by using the target dialog data;

wherein the target dialog data template comprises a plurality of single-round dialog data templates, and wherein the obtaining the target dialog data template comprises:

sampling a dialog data set stored in the memory based on a dialog action label by using a preset rule to obtain a target dialog action label sequence comprising a plurality of target dialog action labels, wherein the dialog data set comprises a plurality of dialog action labels and a plurality of single-round dialog data templates corresponding to the plurality of the dialog action labels;

determining, based on each target dialog action label in the target dialog action label sequence, a target single-round dialog data template corresponding to the target dialog action label; and building, based on the target dialog action label sequence and a plurality of target single-round dialog data templates corresponding to the target dialog action label sequence, the target dialog data template comprising the plurality of target single-round dialog data templates, and wherein, the sampling the dialog data set based on the dialog action label by using the preset rule comprises:

for each target dialog action label in the target dialog action label sequence, determining respective sampling probabilities of the plurality of dialog action labels based at least on a preceding target dialog action label of the target dialog action label; and sampling the dialog data set based on the respective sampling probabilities of the plurality of dialog action labels, to obtain the target dialog action label.

9. The electronic device according to claim 8, wherein the obtaining the target dialog data template comprises:

obtaining historical dialog data, wherein the historical dialog data comprises one or more pieces of historical single-round dialog data, and each piece of the historical single-round dialog data comprises at least one keyword; and determining, based on the at least one keyword comprised in each piece of historical single-round dialog data, the one or more keyword slots and the related information about each keyword slot to obtain the target single-round dialog data template corresponding to the historical single-round dialog data.

10. The electronic device according to claim 9, wherein each piece of the historical single-round dialog data further comprises intent information, and wherein the obtaining the target dialog data template further comprises:

determining the intent information of each piece of the historical single-round dialog data as the intent information of the target single-round dialog data template corresponding to the historical single-round dialog data.

11. The electronic device according to claim 8, wherein each target single-round dialog data template in the target dialog data template further comprises intent information, wherein the intent information of each target single-round dialog data template is determined based on the dialog action label corresponding to the target single-round dialog data template.

12. The electronic device according to claim 8, wherein the related information about each keyword slot further comprises expression information of the keyword slot, and the one or more programs further comprising instructions for:

obtaining an expression information set of the keyword slot, wherein the expression information set comprises a plurality of mapping relationships between the expression information and the attribute information of keyword slots, wherein the filling the target single-round dialog data template with the one or more target keywords, to obtain the target dialog data comprises:

determining the expression information of the keyword slot from the expression information set of the keyword slot based on the attribute information of each keyword slot comprised in the target single-round dialog data template; and filling the target single-round dialog data template with the one or more target keywords based on the location information and the expression information of the one or more keyword slots, to obtain the target dialog data.

13. The device according to claim 8, wherein the attribute information of each keyword slot comprises at least one of part-of-speech information and class information of a keyword filled in the keyword slot.

14. A non-transitory computer-readable storage medium storing one or more programs, the one or more programs comprising instructions, which when executed by one or more processors of an electronic device, cause the electronic device to:

obtaining a target dialog data template, wherein the target dialog data template comprises one or more target single-round dialog data templates, wherein each target single-round dialog data template comprises one or more keyword slots and related information about each keyword slot, and wherein the related information about each keyword slot comprises location information and attribute information;

for each keyword slot, determining, from a keyword data set based on at least the attribute information of the keyword slot, a target keyword that matches the keyword slot, wherein the keyword data set comprises a plurality of keywords and attribute information of each keyword;

for each target single-round dialog data template of the target dialog data template, filling the target single-round dialog data template with one or more target keywords based on the location information of the one or more keyword slots, to obtain target dialog data, and training a neural network model by using the target dialog data;

wherein the target dialog data template comprises a plurality of single-round dialog data templates, and wherein the obtaining the target dialog data template comprises:

sampling a dialog data set stored in a memory of the electronic device based on a dialog action label by using a preset rule to obtain a target dialog action label sequence comprising a plurality of target dialog action labels, wherein the dialog data set comprises a plurality of dialog action labels and a plurality of single-round dialog data templates corresponding to the plurality of the dialog action labels;

determining, based on each target dialog action label in the target dialog action label sequence, a target single-round dialog data template corresponding to the target dialog action label; and building, based on the target dialog action label sequence and a plurality of target single-round dialog data templates corresponding to the target dialog action label sequence, the target dialog data template comprising the plurality of target single-round dialog data templates, and wherein, the sampling the dialog data set based on the dialog action label by using the preset rule comprises:

for each target dialog action label in the target dialog action label sequence, determining respective sampling probabilities of the plurality of dialog action labels based at least on a preceding target dialog action label of the target dialog action label; and sampling the dialog data set based on the respective sampling probabilities of the plurality of dialog action labels, to obtain the target dialog action label.

15. The computer-readable storage medium according to claim 14, wherein the obtaining a target dialog data template comprises:

obtaining historical dialog data, wherein the historical dialog data comprises one or more pieces of historical single-round dialog data, and each piece of the historical single-round dialog data comprises at least one keyword; and determining, based on the at least one keyword comprised in each piece of historical single-round dialog data, the one or more keyword slots and the related information about each keyword slot to obtain the target single-round dialog data template corresponding to the historical single-round dialog data.

* * * * *